(12) United States Patent
Yokoyama

(10) Patent No.: US 9,826,617 B2
(45) Date of Patent: Nov. 21, 2017

(54) EXTREME ULTRAVIOLET LIGHT SOURCE DEVICE

(71) Applicant: USHIO DENKI KABUSHIKI KAISHA, Tokyo (JP)

(72) Inventor: Takuma Yokoyama, Tokyo (JP)

(73) Assignee: USHIO DENKI KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/312,003

(22) PCT Filed: May 22, 2015

(86) PCT No.: PCT/JP2015/002593
§ 371 (c)(1),
(2) Date: Nov. 17, 2016

(87) PCT Pub. No.: WO2015/182092
PCT Pub. Date: Dec. 3, 2015

(65) Prior Publication Data
US 2017/0094766 A1    Mar. 30, 2017

(30) Foreign Application Priority Data

May 27, 2014 (JP) ................. 2014-108893

(51) Int. Cl.
*H05G 2/00* (2006.01)
*H01S 3/136* (2006.01)
(Continued)

(52) U.S. Cl.
CPC ............ *H05G 2/008* (2013.01); *H01S 3/101* (2013.01); *H01S 3/1305* (2013.01); *H01S 3/136* (2013.01); *H01S 3/16* (2013.01); *H05G 2/003* (2013.01)

(58) Field of Classification Search
CPC ........ H05G 2/003; H05G 2/008; H01S 3/007; H01S 3/101; H01S 3/1305; H01S 3/136; H01S 3/16
(Continued)

(56) References Cited

U.S. PATENT DOCUMENTS 6,265,708 B1 *  7/2001  Tanaka ................. G02F 1/0126
                                                  250/214.1
7,087,914 B2 *  8/2006  Akins .................... B82Y 10/00
                                                  250/493.1
(Continued)

FOREIGN PATENT DOCUMENTS

EP   2170020 A1   3/2010
JP   2010-080362 A   4/2010
(Continued)

OTHER PUBLICATIONS

International Search Report issued in PCT/JP2015/002593; dated Aug. 11, 2015.
(Continued)

*Primary Examiner* — Tung X Le
(74) *Attorney, Agent, or Firm* — Studebaker & Brackett PC

(57) ABSTRACT

An extreme ultraviolet light source device that can stably and efficiently provide EUV emission. The EUV light source device includes a first laser source that irradiates a high-temperature plasma raw material with a laser beam, and a second laser source that, after the high-temperature plasma raw material is irradiated with the laser beam and before effective extreme ultraviolet light is emitted, irradiates the raw material in that region which is irradiated with the laser beam, with a second laser beam. The EUV light source device also includes a return light blocking unit that prevents return light of the laser beam, which is emitted from the first
(Continued)

laser source, from reaching a light emission opening of the second laser source.

15 Claims, 6 Drawing Sheets

(51) Int. Cl.
*H01S 3/101* (2006.01)
*H01S 3/13* (2006.01)
*H01S 3/16* (2006.01)

(58) Field of Classification Search
USPC ......... 250/492.1, 492.2, 493.1, 494.1, 504 R
See application file for complete search history.

(56) References Cited

U.S. PATENT DOCUMENTS

| | | | |
|---|---|---|---|
| 7,375,352 B2* | 5/2008 | Takaoka | G01N 23/00 250/492.1 |
| 7,388,220 B2* | 6/2008 | Fomenkov | B82Y 10/00 250/493.1 |
| 8,586,954 B2* | 11/2013 | Asayama | H05G 2/003 250/365 |
| 2006/0163500 A1* | 7/2006 | Inoue | B82Y 10/00 250/493.1 |
| 2009/0127479 A1* | 5/2009 | Hosokai | B82Y 10/00 250/504 R |
| 2009/0161201 A1 | 6/2009 | Ershov et al. | |
| 2010/0176312 A1* | 7/2010 | Komori | G03F 7/70033 250/504 R |
| 2012/0326058 A1* | 12/2012 | Sato | G03F 7/70166 250/504 R |
| 2013/0015354 A1* | 1/2013 | Diamond | G01N 21/4795 250/339.07 |

FOREIGN PATENT DOCUMENTS

| | | |
|---|---|---|
| JP | 4623192 B2 | 2/2011 |
| JP | 2011-508965 A | 3/2011 |
| WO | 2009/085095 A1 | 7/2009 |

OTHER PUBLICATIONS

An Office Action; "Notice of Reasons for Rejection", issued by the Japanese Patent Office dated Sep. 5, 2017, which corresponds to Japanese Patent Application No. 2014-108893 and is related to U.S. Appl. No. 15/312,003; with English language translation.

* cited by examiner

EXTREME ULTRAVIOLET LIGHT SOURCE DEVICE

TECHNICAL FIELD

The present invention relates to an extreme ultraviolet light source device that generates extreme ultraviolet light.

BACKGROUND ART

In recent years, a wavelength of exposure light emitted from a light source is reduced along with miniaturization and high integration of semiconductor integrated circuits. As a next-generation light source for semiconductor exposure, a light source device (hereinafter occasionally referred to as an "EUV light source device") for emitting extreme ultraviolet light (hereinafter occasionally referred to as "EUV light") particularly having a wavelength of 13.5 nm is developed.

The EUV light source device may use one of known methods to generate the EUV light. One of such methods includes heating and exciting an extreme ultraviolet light emission seed (EUV emission seed) to generate high-temperature plasma, and taking out the EUV light from the high-temperature plasma.

The EUV light source devices employing such method are classified into an LPP (Laser Produced Plasma) type and a DPP (Discharge Produced Plasma) type, depending upon the employed manner of generating the high-temperature plasma.

A DPP type EUV light source device applies a high voltage across a pair of electrodes, which are supplied with a discharge gas containing an extreme ultraviolet light emission seed, to generate high-density and high-temperature plasma upon electric discharge, and uses extreme ultraviolet light emitted from the high-density and high-temperature plasma. For use with the DPP type EUV light source device, a method has been proposed that includes supplying a surface of one of the electrodes, which are used to generate the electric discharge, with a raw material such as Sn (tin) or Li (lithium), and irradiating the raw material with an energy beam such as a laser beam for evaporation thereof such that high-temperature plasma is generated upon the electric discharge. Such method is sometimes referred to as an LDP (Laser Assisted Discharge Produced Plasma) method or an LDP type.

Technology of an LDP-type EUV light source device is disclosed in, for example, Patent Literature Document 1 (Japanese Patent No. 4623192). This technology of the LDP-type EUV light source device includes a first laser source that irradiates a raw material, which is delivered onto an electrode, with a first laser beam, to vaporize the raw material thereby triggering the discharge between two electrodes, and also includes a second laser source that, after irradiating the raw material with the first laser beam and before triggering the discharge between the two discharge electrodes, irradiates the raw material on the discharge electrode in that region which is irradiated with the first laser beam, with a second laser beam to further vaporize the raw material. This technology of the LDP-type EUV light source device emits the second laser beam to supply the discharge area with a gas of high-density plasma raw material, thereby obtaining an efficient EUV radiation.

LISTING OF REFERENCES

Patent Literature Documents

Patent Literature Document 1: Japanese Patent No. 4623192

SUMMARY OF THE INVENTION

Problems to Be Solved By the Invention

When the technology disclosed in Patent Literature Document 1 (Japanese Patent No. 4623192) is used, however, there is an interval (time difference) between timing of emitting the first laser beam and timing of emitting the second laser beam, and therefore the EUV generation efficiency varies with this interval (time difference). Thus, it is necessary to appropriately decide (set) the timing of emitting the second laser beam.

The timing of emitting the second laser beam is decided from optimal timing that is obtained in advance by experiments conducted on the basis of the distance between the two electrodes and pulse power, which is applied to between the two electrodes. However, if the laser oscillation of the second laser source becomes unstable, then the timing of emitting the second laser beam shifts from the optimal timing, and therefore the EUV generation efficiency drops.

For example, the first laser beam is directed to the electrode prior to the second laser beam, and the first laser beam is reflected by the electrode. The reflected first laser beam (return light) may be incident to the second laser source. Then, the laser oscillation of the second laser source may become unstable. As a result, the emission timing of the second laser beam from the second laser source may fluctuate.

The technology disclosed in Patent Literature Document 1 (Japanese Patent No. 4623192) takes no measures to possible causes for the above-described unstable oscillation of the second laser source. Thus, it may not be possible to obtain an efficient EUV radiation.

An object of the present invention is to provide an extreme ultraviolet light source device that can stably provide EUV radiation in an efficient manner.

Solution to the Problems

In order to overcome the above-described problems, an extreme ultraviolet light source device according to one aspect of the present invention is directed to an extreme ultraviolet light source device configured to emit extreme ultraviolet light, and includes a first energy beam emitting unit configured to emit a first energy beam to a raw material. The raw material is able to emit the extreme ultraviolet light. The extreme ultraviolet light source device also includes a second energy beam emitting unit configured to emit a second energy beam to the raw material in an area, which is irradiated with the first energy beam, after the raw material is irradiated with the first energy beam from the first energy beam emitting unit (after the first energy beam emitting unit emits the first energy beam to the raw material) and before effective extreme ultraviolet light is emitted from the raw material. The extreme ultraviolet light source device also includes an extreme ultraviolet light generating unit configured to excite the raw material with the first energy beam, which is emitted from the first energy beam emitting unit, and the second energy beam, which is emitted from the second energy beam emitting unit, thereby generating the extreme ultraviolet light. The extreme ultraviolet light source device also includes a return light blocking unit configured to block return light of the first energy beam, which is emitted from the first energy beam emitting unit, from arriving at a light emission exit (opening) of the second energy beam emitting unit.

As described above, the device prevents the return light of the first energy beam, which is emitted prior to the second energy beam, from arriving at the light emission opening of the second energy beam emitting unit. Therefore, it is possible to avoid that the operation of the second energy beam emitting unit becomes unstable due to a phenomenon that the return light enters the light emission opening of the second energy beam emitting unit. Accordingly, it is possible to emit the second energy beam from the second energy beam emitting unit at an appropriate timing, and provide the extreme ultraviolet light (EUV light) efficiently and stably.

According to another aspect of the present invention, the return light blocking unit may be an optical isolator.

When this aspect is used, and the return light blocking unit is a polarization dependent optical isolator, then the return light blocking unit can allow the second energy beam, which is emitted from the second energy beam emitting unit, to pass therethrough and block the return light of the first energy beam, which proceeds in a direction opposite the second energy beam that passes through the return light blocking unit. If the return light blocking unit is a polarization independent optical isolator, then the return light blocking unit can shift the optical path of the return light of the first energy beam, which proceeds in a direction opposite the second energy beam, from the optical path of the second energy beam. In this manner, a simple configuration can appropriately prevent the return light of the first energy beam from arriving at the light emission opening of the second energy beam emitting unit.

According to still another aspect of the present invention, the extreme ultraviolet light source device may further include an optical axis synthesizing unit configured to synthesize an optical axis of the first energy beam, which is emitted from the first energy beam emitting unit, and an optical axis of the second energy beam, which is emitted from the second energy beam emitting unit, to substantially a same axis. The return light blocking unit may be located between the second energy beam emitting unit and the optical axis synthesizing unit.

With this configuration, the optical axis synthesizing unit synthesizes the optical axis of the first energy beam and the optical axis of the second energy beam to substantially the same axis. Thus, it is possible to appropriately irradiate the raw material in (on) the area, which is irradiated with the first energy beam, with the second energy beam in an overlapping manner. When the return light of the first energy beam proceeds backward and passes through the optical axis synthesizing unit, the return light might be erroneously guided toward the second energy beam emitting unit. Even if this occurs, the return light blocking unit is located between the second energy beam emitting unit and the optical axis synthesizing unit. Thus, it is possible to reliably prevent the return light from arriving at the light emission opening of the second energy beam emitting unit.

According to yet another aspect of the present invention, the optical axis synthesizing unit may be a polarization beam splitter.

Part of the return light of the first energy beam might be reflected by the polarization beam splitter although all the return light should theoretically pass through the polarization beam splitter. Also, part of the return light of the first energy beam might pass through the polarization beam splitter although the return light should theoretically be reflected by the polarization beam splitter. Then, the return light of the first energy beam might be guided to the second energy beam emitting unit. Even if the return light of the first energy beam is guided to the second energy beam emitting unit, the configuration of this aspect can reliably prevent the return light from arriving at the light emission opening of the second energy beam emitting unit as the return light blocking unit is located between the second energy beam emitting unit and the polarization beam splitter.

According to another aspect of the present invention, the extreme ultraviolet light source device may further include a half wave plate located on an optical path of the second laser beam between the second energy beam emitting unit and the optical axis synthesizing unit. The return light blocking unit may be located between the second energy beam emitting unit and the half wave plate.

With such configuration, it is possible to arrange the return light blocking unit at a position close to the second energy beam emitting unit. As a result, it is possible to reliably prevent the light, which proceeds in a direction opposite the proceeding direction of the second laser beam, from entering the second energy beam emitting unit. Thus, it is also possible to reliably prevent (block) stray light and the like from entering the light emission opening of the second energy beam emitting unit.

According to another aspect of the present invention, the extreme ultraviolet light source device may further include a second return light blocking unit for blocking return light of the second energy beam, which is emitted from the second energy beam emitting unit, from arriving at a light emission exit (opening) of the first energy beam emitting unit.

With this configuration, the device prevents the return light of the second energy beam from arriving at the light emission opening of the first energy beam emitting unit. Thus, it is possible to avoid the unstable operation of the first energy beam emitting unit, which would otherwise be caused by a phenomenon that the return light enters the light emission opening of the first energy beam emitting unit. Therefore, it is possible to emit the first energy beam from the first energy beam emitting unit at an appropriate timing, and provide the EUV emission efficiently and stably.

According to another aspect of the present invention, the extreme ultraviolet light source device may further include a pair of discharge electrodes, which face each other, and a pulse power supply unit for supplying a pulse power to the discharge electrodes. The first energy beam emitting unit may be configured to emit the first energy beam to the raw material, which is conveyed onto the discharge electrode, such that the raw material is vaporized and discharge is triggered between the two discharge electrodes. The second energy beam emitting unit may emit the second energy beam to the raw material on the discharge electrode in an area, which is irradiated with the first energy beam, after the first energy beam emitting unit emits the first energy beam and before the discharge is triggered between the two discharge electrodes.

With this configuration, the DPP type EUV light source device can emit the EUV light efficiently and stably.

According to another aspect of the present invention, the raw material may be a target material, the first energy beam emitting unit may emit a preliminary laser pulse, as the first energy beam, to diffuse droplets (or at least one droplet) of the target material, and the second energy beam emitting unit may emit a main laser pulse, as the second energy beam, to cause the raw material to emit the effective extreme ultraviolet light.

With this configuration, the LPP type EUV light source device can emit the EUV light efficiently and stably.

Advantageous Effects of the Invention

The extreme ultraviolet light source device of the present invention can suppress or prevent the unstable operation of the second energy beam emitting unit, which would otherwise be caused by the return light of the first energy beam, and can stabilize the respective timing of emitting the two energy beams. Therefore, the EUV emission is efficiently obtained in a stable manner (EUV light is emitted efficiently and stably). The above-described object, aspects and advantages of the present invention and other objects, aspects and advantages of the present invention would become apparent to those skilled in the art from the following mode for carrying out the invention (detailed description of the embodiments of the present invention) with reference to the accompanying drawings and the appended claims.

DETAILED DESCRIPTION OF EMBODIMENTS

Now, embodiments of the present invention will be described with reference to the accompanying drawings.

Figure 1:
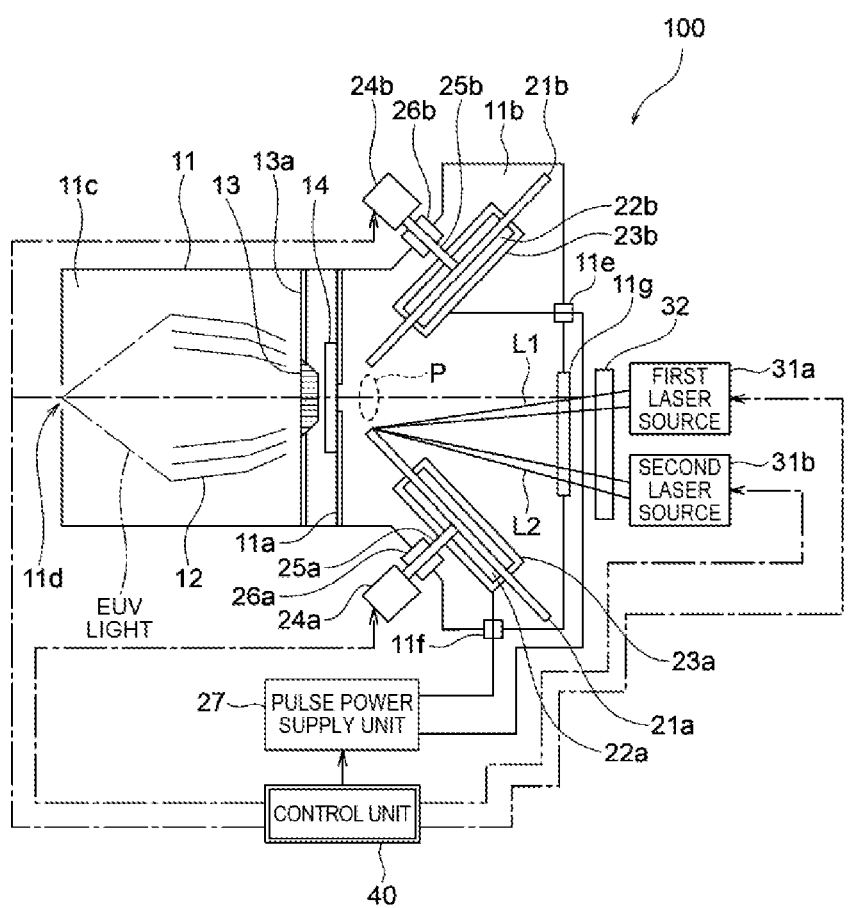
FIG. 1 schematically shows a configuration of an extreme ultraviolet light source device according to an embodiment of the present invention.

FIG. 1 schematically shows an extreme ultraviolet light source device according to an embodiment of the present invention.

The extreme ultraviolet light source device (EUV light source device) 100 is a device for emitting extreme ultraviolet light (EUV light) having a wavelength of, for example, 13.5 nm. The light source device 100 may be used as a light source for emitting exposure light applied to a semiconductor device.

The EUV light source device 100 of this embodiment is a DPP type EUV light source device. More specifically, the EUV light source device 100 is an LDP type EUV light source device for irradiating a high-temperature plasma raw material, which is supplied (delivered) onto an electrode surface for the electric discharge, with an energy beam such as a laser beam to vaporize the high-temperature raw material and subsequently generate high-temperature plasma by the electric discharge.

As shown in FIG. 1, the EUV light source device 100 has a chamber 11 that is used as a discharge vessel. The chamber 11 is generally partitioned into two spaces by a partition wall 11a that has an opening formed therein. One of the two spaces is a discharge space 11b and the other is a light condensing space 11c.

In the discharge space 11b, a pair of independently rotatable discharge electrodes 21a and 21b are disposed. The discharge electrodes 21a and 21b face each other, and are spaced from each other. Each of the discharge electrodes 21a and 21b is an element for heating and exciting a high-temperature plasma raw material containing an EUV light emission seed(s).

The discharge space 11b is maintained at a pressure of a vacuum atmosphere to appropriately generate electric discharge that is used to heat and excite the high-temperature plasma raw material containing the EUV light emission seed(s).

In the light condensing space 11c, an EUV condensing mirror 12, a foil trap 13, and a gas feed nozzle 14 are disposed.

The EUV condensing mirror 12 condenses EUV light, which is emitted upon heating and exciting the high-temperature plasma raw material, and introduces the condensed EUV light to, for example, an irradiation system of an exposure device (not shown) from an EUV outlet 11d formed in a wall of the chamber 11.

The EUV condensing mirror 12 has, for example, a structure in which a plurality of thin concave mirrors are disposed highly precisely in a nested form. Each concave mirror has a reflecting surface in the form of, for example, an ellipsoid of revolution, a paraboloid of revolution, or a Wolter shape. Each concave mirror is in the form of a body of revolution. The Wolter shape is a concave shape having a plane of light incidence made up of a hyperboloid of revolution and an ellipsoid of revolution or a hyperboloid of revolution and a paraboloid of revolution in order from the light incidence side.

A material of a base member of each concave mirror is, for example, nickel (Ni). In order to reflect EUV light having a very short wavelength, the reflecting surface of each concave mirror is shaped into an excellently smooth surface. A metallic film made of, for example, ruthenium (Ru), molybdenum (Mo), rhodium (Rh) or the like is formed on the smooth surface as a reflective material. The reflecting surface of each concave mirror is precisely coated with such metallic film.

Thus, the EUV condensing mirror 12 appropriately reflects EUV light having an oblique-incidence angle of 0 degree to 25 degrees and condenses it.

The foil trap 13 and the gas feed nozzle 14 serve, in combination, a debris trap to restrict or prevent the debris, which is generated as the plasma is generated upon discharge, from moving to the EUV light condensing part.

The foil trap 13 is fixedly secured in the light condensing space 11c of the chamber 11 by a foil trap holding wall 13a. The foil trap 13 may include a plurality of plates and a ring-shaped support that supports the plates, and be arranged not to block the EUV light emitted from the high temperature plasma.

It should be noted that the foil trap 13 is not limited to the above-described configuration. For example, the foil trap 13 may be a rotary trap, or a combination of the rotary trap and a stationary trap.

The gas feed nozzle 14 is an element for feeding gas into the chamber 11 from a gas feed unit (not shown). As the gas is fed to the gas feed nozzle 14 from the gas feed unit, the gas is released, in the form of sheet, from an opening of the gas feed nozzle 14 in a direction perpendicular to the drawing sheet of FIG. 1. This creates a gas curtain. The gas curtain changes the moving direction of the debris to restrict or hinder the debris from reaching the EUV light condensing mirror 12. Preferably, the gas used for the gas curtain is a gas that has high transmissivity to the EUV light, and the gas is, for example, a rare gas (noble gas) such as helium (He) or argon (Ar), or hydrogen ($H_2$). The gas feed nozzle 14 is located at a position that does not block the EUV light, which should be incident to the EUV light condensing mirror 12, when the EUV light is emitted from the high temperature plasma raw material upon heating and exciting the high temperature plasma raw material.

A pair of discharge electrodes 21a and 21b, which are provided in the discharge space 11b, are disc-shaped members and made from metal. For example, the discharge electrodes 21a and 21b are made from metal having a high melting point, such as tungsten, molybdenum or tantalum. One of the two discharge electrodes 21a and 21b is the cathode 21a, and the other is the anode 21b.

The discharge electrode 21a is arranged such that part of the discharge electrode 21a is immersed in a container 23a, in which the high temperature plasma raw material 22a is loaded (received). A rotating shaft 25a of a motor 24a is attached to an approximate center of the discharge electrode 21a. Thus, the discharge electrode 21a rotates as the motor 24a causes the rotating shaft 25a to rotate. The activation/deactivation and rotations of the motor 24a are controlled by a control unit 40.

The rotating shaft 25a extends into the chamber 11 via, for example, a mechanical seal 26a. The mechanical seal 26a allows the rotating shaft 25a to rotate while maintaining the depressurized condition of the interior of the chamber 11.

Similar to the discharge electrode 21a, the discharge electrode 21b is arranged such that part of the discharge electrode 21b is immersed in a container 23b, in which the high temperature plasma raw material 22b is loaded (received). A rotating shaft 25b of a motor 24b is attached to an approximate center of the discharge electrode 21b. Thus, the discharge electrode 21b rotates as the motor 24b causes the rotating shaft 25b to rotate. The activation/deactivation and rotations of the motor 24b are controlled by the control unit 40.

The rotating shaft 25b extends into the chamber 11 via, for example, a mechanical seal 26b. The mechanical seal 26b allows the rotating shaft 25b to rotate while maintaining the depressurized condition of the interior of the chamber 11.

The high temperature plasma raw material 22a, which is liquid and rides the surface of the discharge electrode 21a, and the high temperature plasma raw material 22b, which is liquid and rides the surface of the discharge electrode 21b, are conveyed (delivered) to a discharge area (space) as the discharge electrodes 21a and 21b rotate.

In this specification, the discharge area is space in which the discharge takes place between the two electrodes 21a and 21b. Specifically, the discharge area is defined by the shortest distance between the periphery (peripheral edge) of the electrode 21a and the periphery (peripheral edge) of the electrode 21b.

The high temperature plasma raw materials 22a and 22b are molten metal such as liquid tin (Sn). The high temperature plasma raw materials 22a and 22b serve as the power-feed metallic elements that feed electricity (electric power) to the discharge electrodes 21a and 21b.

The containers 23a and 23b are coupled to the pulse power feed unit 27 via the electric power introductory parts 11e and 11f. The electric power introductory parts 11e and 11f are not electrically conductive, and can maintain the reduced pressure condition of the chamber 11. The containers 23a and 23b are electrically conductive, and tin 22a and 22b are electrically conductive. Part of the discharge electrode 21a is immersed in tin 22a, and part of the discharge electrode 21b is immersed in tin 22b. Thus, as the pulse power is applied between the containers 23a and 23b from the pulse power feed unit 27, the pulse power is applied between the discharge electrodes 21a and 21b.

Although not illustrated, the container 23a is equipped with a temperature adjusting unit for maintaining tin 22a in a molten state, and the container 23b is equipped with another temperature adjusting unit for maintaining tin 22b in a molten state.

The pulse power feed unit 27 applies a pulse power, which has a short pulse width, across the containers 23a and 23b, i.e., across the discharge electrodes 21a and 21b. The pulse power feed unit 27 is activated and controlled by the control unit 40.

The first laser source 31a and the second laser source 31b irradiate tin 22a, which is conveyed to the discharge area, on the discharge electrode 21a with laser beams (energy beams). The first laser source 31a corresponds to a first energy beam emitting unit, and the second laser source 31b corresponds to a second energy beam emitting unit.

Each of the first laser source 31a and the second laser source 31b is, for example an Nd: $YVO_4$ laser device (Neodymium-doped Yttrium Orthovanadate laser device). Each of the first laser source 31a and the second laser source 31b emits, for example, a p-polarized laser beam.

The laser beam L1 (first energy beam) emitted from the first laser source 31a and the laser beam L2 (second energy beam) emitted from the second laser source 31b are incident to the window 11g of the chamber 11 through the laser alignment section 32, and then guided onto the discharge electrode 21a. Timing for the first laser source 31a to emit the laser beam L1 and timing for the second laser source 31b to emit the laser beam L2 are controlled by the control unit 40.

The high temperature plasma raw material conveyed to the discharge area is irradiated with the laser beams while the pulse electric power is being applied to the discharge electrodes 21a and 21b from the pulse power feed unit 27. This causes the high temperature plasma raw material to vaporize, and the pulse discharge takes place (pulse discharge is triggered) between the two electrodes 21a and 21b. As a result, the plasma P is generated from the high temperature plasma raw material. A large current flows upon the discharge, and this current heats and excites the plasma P so that the temperature of the plasma P becomes high. The high temperature plasma P then emits the EUV light.

Because the pulse power is applied between the discharge electrodes 21a and 21b, as mentioned above, the discharge between the two electrodes 21a and 21b is the pulse discharge (pulsing discharge), and the EUV light emitted from the plasma is the pulse light (pulsing light).

In this embodiment, the high temperature plasma raw material 22a on the discharge electrode 21a (the area irradiated with the laser beam L1) is irradiated with the laser beam L2 from the second laser source 31b after the high temperature plasma raw material 22a on the discharge electrode 21a is irradiated with the laser beam L1 from the first laser source 31a and until the discharge starts as a result of the irradiation with the laser beam L1.

The discharge is triggered by the raw material gas generated by the irradiation with the laser beam L1. When the discharge starts (at the time of the start of the discharge), the raw material gas generated by the irradiation with the laser beam L2 does not yet expand (spread) widely in three dimensional directions, because only a short time elapses after the irradiation with the laser beam L2, i.e., the raw material gas is present between the two electrodes at a high gas density.

Therefore, the high pinch efficiency is obtained as the raw material gas is compressed and heated by the magnetic pressure along with the increase of the discharge current. Thus, the ion density and the electron temperature reach those values which can provide the EUV light emission at a high conversion efficiency. The conversion efficiency is a value obtained by dividing the energy of the EUV light emitted from the plasma by the energy used for the discharge between the electrodes 21a and 21b.

The EUV generation efficiency varies with the interval (time difference) between the timing of the irradiation with the laser beam L1 (timing of emitting the laser beam L1) and the timing of the irradiation with the laser beam L2 (timing of emitting the laser beam L2). Thus, the interval between the timing of emitting the laser beam L1 and the timing of emitting the laser beam L2 is set to a value that maximizes the EUV generation efficiency.

For example, a $YVO_4$ laser device was used as each of the first laser source 31a and the second laser source 31b to emit a laser beam at a 1064 nm wavelength, and the relation between the interval between the timing of emitting the laser beam L1 and the timing of emitting the laser beam L2 and the EUV generation efficiency was examined. Then, it was found that the EUV generation efficiency took the maximum value when the interval between the timing of emitting the laser beam L1 and the timing of emitting the laser beam L2 was 50 ns (nanoseconds). Thus, in such case, the interval between the timing of emitting the laser beam L1 and the timing of emitting the laser beam L2 is set to 50 ns.

The optimal timing of emitting the laser beam L2 varies with the distance between the two electrodes and/or a value of the pulse electric power applied to the electrodes. Therefore, an optimal interval between the timing of emitting the laser beam L1 and the timing of emitting the laser beam L2 is obtained in advance by experiments or the like, and the optimal interval is set to the control unit or the laser sources.

The detail of the structure of the laser alignment section 32 will now be described with reference to FIG. 2.

The laser alignment section 32 is configured to guide (introduce) the laser beam L1 to the discharge electrode 21a from the first laser source 31a and the laser beam L2 to the discharge electrode 21a from the second laser source 31b. The laser alignment section 32 has an opto-isolator (optical isolator) 321, a half wave plate 322, a movable mirror 323, a beam splitter 324, a mirror 325, a movable lens 326, and another movable mirror 327.

The optical isolator 321, the half wave plate 322, the movable mirror 323, the beam splitter 324 and the mirror 325 are used to adjust the position of the laser beam L1 and the position of the laser beam L2. The movable lens 326 and the movable mirror 327 are used to adjust the spot diameter of each of the two laser beams L1 and L2 that are incident onto the discharge electrode 21a, and the irradiation position on the discharge electrode 21a of each of the laser beams L1 and L2.

A chamber of the laser alignment section 32 that houses the above-mentioned optical elements has a window 32a to which the laser beam L1 is incident, another window 32b to which the laser beam L2 is incident, and a still another window 32c from which the laser beams L1 and L2 exit.

The interior of the chamber of the laser alignment section 32 is purged with dry nitrogen, cleaning dry air (CDA) or the like. The purging is conducted in order to prevent the surfaces of the optical elements housed in the chamber from getting fogged (misted) by moisture or the like.

The laser beam L1 that has entered the laser alignment section 32 from the window 32a arrives at the beam splitter 324.

The beam splitter 324 is a polarization beam splitter. For example, the beam splitter 324 is configured to allow the p-polarized light component to pass therethrough, and reflect the s-polarized light component. The polarized light of the laser beam L1 is a p-polarized light, and therefore the laser beam L1 passes through the beam splitter 324 and is introduced to the movable lens 326 by the mirror 325.

The polarization beam splitter has, for example, a synthetic quartz substrate and a dielectric multi-layer polarizing film formed on the surface of the synthetic quartz substrate.

On the other hand, the laser beam L2 that has entered the laser alignment section 32 from the window 32b arrives at the optical isolator 321.

The optical isolator 321 is, for example, a polarization dependent optical isolator that has a polarizer and a Faraday rotator. The optical isolator 321 is arranged such that the optical isolator 321 allows the light to pass therethrough if the light proceeds in the same direction as the laser beam L2 (the emitting direction of the laser beam L2 from the second laser source 31b), and blocks the light that proceeds in the opposite direction.

It should be noted that the optical isolator 321 may be a polarization independent optical isolator that has a birefringent crystal wedge and a Faraday rotator. When this optical isolator is used, the optical isolator 321 is arranged such that the optical isolator 321 prevents the light that proceeds in a direction opposite the laser beam L2 from reaching the light emitting opening for the laser beam L2 of the second laser source 31b.

As such, the laser beam L2 emitted from the second laser source 31b passes through the optical isolator 321 and arrives at the half wave plate 322. Because the polarized light of the laser beam L2 emitted from the second laser source 31b is the p-polarized light, the polarized light of the laser beam L2 that has passed through the half wave plate 322 is the s-polarized light. The half wave plate 322 is, for example, a quartz crystal wave plate.

The laser beam L2 that has passed through the half wave plate 322 and become the s-polarized light is reflected by the movable mirror 323 and arrives at the beam splitter 324. The movable mirror 323 is configured to be able to rotate (turn) in the directions as indicated by the arrows in FIG. 2 such that the movable mirror 323 can adjust the irradiation position of the laser beam L2 on the beam splitter 324.

The polarized light of the laser beam L2 that arrives at the beam splitter 324 is the s-polarized light. Thus, the laser beam L2 is reflected by the beam splitter 324 and introduced to the mirror 325. Then, the laser beam L2 is guided to the movable lens 326 from the mirror 325.

In this manner, the beam splitter 324 serves as an optical axis synthesizing unit that synthesizes (combines) the optical axis of the laser beam L1 emitted from the first laser source 31a and the optical axis of the laser beam L2 emitted from the second laser source 31b to substantially the same axis.

The laser beams L1 and L2 guided to the movable lens 326 pass through the movable lens 326 and arrive at the movable mirror 327. The movable mirror 326 is configured to be able to linearly move in the directions as indicated by the arrows in FIG. 2 such that the movable mirror 326 can adjust the spot diameter of each of the laser beams L1 and L2.

The laser beams L1 and L2 reflected by the movable mirror 327 pass through the window 32c of the laser alignment section 32, and enter the chamber 11 from the window 11g such that the discharge electrode 21a is irradiated with the laser beams L1 and L2. The movable mirror 327 is configured to be able to turn in the directions as indicated by the arrows in FIG. 2 such that the movable mirror 327 can adjust the irradiation positions of the laser beams L1 and L2 on the discharge electrode 21a.

In this manner, the laser beam L1 emitted from the first laser source 31a passes through the beam splitter 324, the mirror 325, the movable lens 326 and the movable mirror 327 in this order before the laser beam L1 arrives at the discharge electrode 21a.

The laser beam L2 emitted from the second laser source 31b passes through the optical isolator 321, the half wave plate 322, the mirror 323, the beam splitter 324, the mirror 325, the movable lens 326 and the movable mirror 327 in this order before the laser beam L2 arrives at the discharge electrode 21a.

Figure 3:
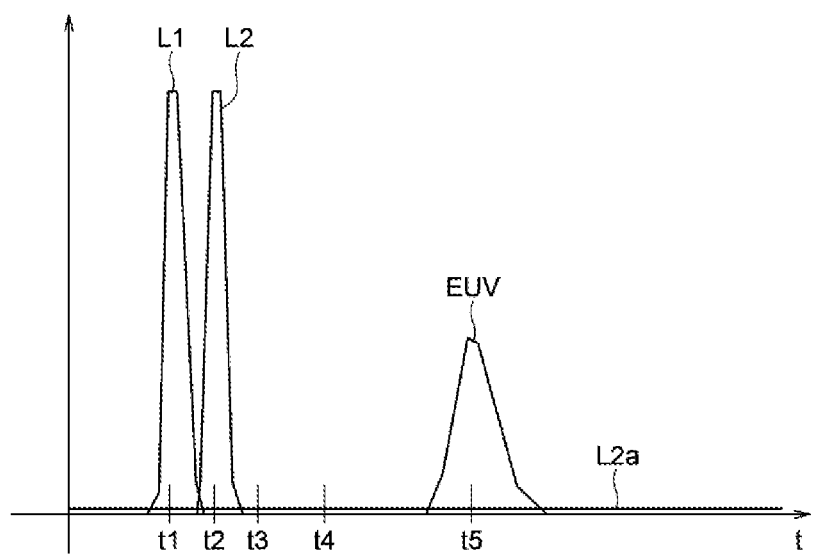
FIG. 3 shows an exemplary relation between timing of emitting a laser beam and timing of EUV emission (timing of generating EUV light).

The operation of the EUV light source device 100 will now be described with reference to FIG. 3. The horizontal axis of the graph in FIG. 3 indicates time, and the vertical axis indicates an arbitrary unit.

Firstly, the control unit 40 activates the motors 24a and 24b to cause the discharge electrodes 21a and 21b to rotate. Then, the liquid high-temperature plasma raw material 22a on the surface of the discharge electrode 21a and the liquid high-temperature plasma raw material 22b on the surface of the discharge electrode 21b are conveyed to the discharge space.

Subsequently, the control unit 40 activates the first laser source 31a at time t1 in FIG. 3 such that the high temperature plasma raw material 22a on the discharge electrode 21a, i.e., the high temperature plasma raw material conveyed to the discharge space, is irradiated with the laser beam L1. Then, the high temperature plasma raw material 22a, which is irradiated with the laser beam L1, is vaporized and the raw material gas is generated. The resulting raw material gas spreads in three dimensional directions, with the normal line to the surface of the high temperature plasma raw material 22a that is irradiated with the laser beam L1 being the center line.

Before the spreading raw material gas arrives at the opposite discharge electrode 21b (i.e., before the effective EUV light is emitted), the control unit 40 activates the second laser source 31b at time t2 such that the high temperature plasma raw material 22a on the discharge electrode 21a (i.e., the area irradiated with the laser beam L1) is irradiated with the laser beam L2. As a result, another raw material gas is generated between the discharge electrodes 21a and 21b.

In this manner, the high temperature plasma raw material 22a on the discharge electrode 21a is irradiated with the laser beam L1, and then (when a predetermined time such as 50 ns elapses) the area which has been irradiated with the laser beam L1 is again irradiated with the laser beam L2 in an overlapping manner.

There is a time difference (interval) between the timing of emitting the laser beam L1 and the timing of emitting the laser beam L2. Accordingly, the raw material gas that is generated upon irradiation with the laser beam L1 arrives at the opposite discharge electrode 21b at time t3, i.e., before the raw material gas generated upon irradiation with the laser beam L2 arrives at the discharge electrode 21b (before the vaporized raw material spreads sufficiently). Subsequently, at time t4, the discharge takes place between the two electrodes 21a and 21b.

The discharge takes place between the edge of the periphery of the discharge electrode 21a and the edge of the periphery of the discharge electrode 21b, and the plasma P is generated. As the pulsing large current that flows in the plasma P heats and excites the plasma P, the temperature of the plasma P becomes high, and the high temperature plasma generates the EUV light at the 13.5 nm wavelength (at time t5).

At this point in time, the raw material, which is vaporized upon irradiation with the laser beam L2, is compressed by the magnetic pressure of the discharge before the vaporized raw material does not spread sufficiently. As a result, the plasma that has a small diameter and a high density is generated. As such, the EUV light that has a high conversion efficiency is emitted.

The control unit 40 repeats the above-described EUV emission process at a predetermined interval.

Part of the laser beam L1, which is directed to the discharge electrode 21a, is reflected by the surface of the discharge electrode 21a, and becomes the return light that proceeds toward the first laser source 31a, i.e., the part of the laser beam L1 moves backward and travels to the first laser source 31a. In other words, the laser beam L1 reflected by the discharge electrode 21a passes through the movable mirror 327, the movable lens 326 and the mirror 325 in this order (FIG. 2), and arrives at the beam splitter 324.

The laser beam L1 that returns to the beam splitter 324 is the p-polarized light. The beam splitter 324 is a polarized light splitter that is configured to allow the p-polarized light component to pass therethrough, and reflect the s-polarized light component. Thus, most of the return light of the laser beam L1 is guided to the first laser source 31a.

In practice, however, part of the return light of the laser beam L1 is reflected by the beam splitter 324 although an amount of the reflection is very small. Then, as shown in FIG. 4, the reflection light L11 passes through the movable mirror 323 and the half wave plate 322, and is guided to the second laser source 31b.

Figure 4:
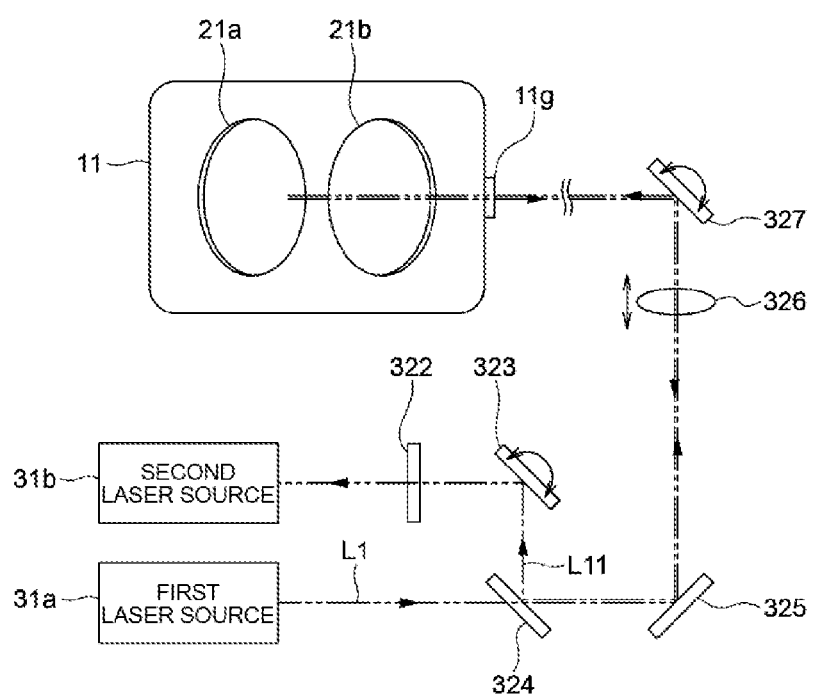
FIG. 4 is a view useful to describe return light of a laser beam L1.

If there is no optical isolator 321 between the second laser source 31b and the half wave plate 322, as shown in FIG. 4, and the optical isolator 321 is configured to block the light that proceeds backward (proceeds in a direction opposite the laser beam L2), then the laser beam L11, i.e., part of the return light of the laser beam L1, is incident to the light exit opening of the second laser source 31b. If the return light of the laser beam L1 enters the second laser source 31b, the light emission timing of the laser beam L2 from the second laser source 31b changes (fluctuates).

This is because the return light of the laser beam L1 enters the laser medium of the second laser source 31b such that the process of the optical amplification, which is caused by stimulated emission (induced emission) in the laser resonator and the laser medium of the second laser source 31b, is disturbed and the laser oscillation becomes unstable.

As described above, the EUV generation efficiency changes with the interval between the timing of emitting the laser beam L1 and the timing of emitting the laser beam L2, and the interval between the timing of emitting the laser beam L1 and the timing of emitting the laser beam L2 is set, in advance, to a value that maximizes the EUV generation efficiency.

Thus, when the laser oscillation of the second laser source 31b becomes unstable and the light emission timing of the laser beam L2 from the second laser source 31b fluctuates, then the interval between the timing of emitting the laser beam L1 and the timing of emitting the laser beam L2 fluctuates. As a result, the EUV generation efficiency drops.

The inventor studied an amount of fluctuation in the timing of emitting laser beam L2, which was caused by a fact that the return light of the laser beam L1 was incident to the second laser source 31b, and found that the amount of fluctuation was about 5 ns to about 20 ns. As described above, the optimal interval between the timing of emitting the laser beam L1 and the timing of emitting the laser beam L2 that maximizes the conversion efficiency of the EUV light emission is about 50 ns. Thus, the influence of the above-mentioned fluctuation range is large, and it can be a sufficient cause to make the EUV light output unstable.

In the embodiment of the present invention, on the other hand, the optical isolator 321 is provided between the second laser source 31b and the half wave plate 322 such that the optical isolator 321 blocks the light that proceeds backward (proceeds in a direction opposite the laser beam L2). Thus, it is possible for the optical isolator 321 to block the return light of the laser beam L1, which is reflected by the discharge electrode 21a and guided toward the second laser source 31b.

Therefore, the fluctuation in the timing of emitting the laser beam L2, which would otherwise be caused by a phenomenon that the return light of the laser beam L1 is incident to the second laser source 31b, is reduced to substantially zero. As a result, the fluctuation in the EUV light intensity is reduced to substantially zero.

In this manner, the high temperature plasma raw material 22a on the discharge electrode 21a is irradiated with the laser beam L1 from the first laser source 31a in this embodiment. Then, before the discharge is triggered by the irradiation with the laser beam L1, the area irradiated with the laser beam L1 is also irradiated with the laser beam L2 from the second laser source 31b. Thus, when the discharge starts upon the irradiation with the laser beam L1, the raw material gas, which is generated upon the irradiation with the laser beam L2, does not yet expand widely in three dimensionally, i.e., the raw material gas that has a large gas density is present between the two electrodes. Therefore, it is possible to provide the EUV emission (radiation) at a high conversion efficiency.

The timing of emitting the laser beam L2 from the second laser source 31b is set to a value that maximizes the conversion efficiency of the EUV light emission. This timing is found by experiments or the like in advance, on the basis of the distance between the two discharge electrodes 21a and 21b and the pulse electric power applied to the two discharge electrodes 21a and 21b. Thus, the density of the gas of the plasma raw material supplied to the discharge area is set to a value that is suitable for the EUV emission.

In addition, the optical isolator 321 is disposed near the exit for the laser beam L2 of the second laser source 31b such that the optical isolator 321 serves as an element for blocking the return light. The optical isolator 321 is located such that the optical isolator 321 allows the light that proceeds in the forward traveling direction of the laser beam L2 to pass therethrough, and block the light that proceeds backward (in the opposite direction). Accordingly, it is possible to prevent the return light of the laser beam L1, which is reflected by the discharge electrode 21a and guided to the second laser source 31b, from reaching the light exit of the second laser source 31b.

Consequently, it is possible to suppress or prevent the unstable operation of the second laser source 31b, which would otherwise be caused by a phenomenon that the return light of the laser beam L1 enters the light exit of the second laser source 31b. It is then possible to emit the laser beam L2 at the preset optimal timing in a stable manner.

As such, the interval between the timing of emitting the first laser beam L1 and the timing of emitting the second laser beam L2 becomes stable, and the EUV emission is carried out at a high conversion efficiency in a stable manner.

Modifications

In the above-described embodiment, the optical isolator 321 is disposed between the second laser source 31b and the half wave plate 322. When the optical isolator 321 is a polarization dependent optical isolator, then the optical isolator 321 may be disposed at a suitable location on a travelling path of the laser beam L2 from the second laser source 31b to the beam splitter 324.

When the optical isolator 321 is a polarization independent optical isolator, then the optical isolator 321 may be disposed at a suitable location on a travelling path of the laser beam L2 from the second laser source 31b to the window 32c. It should be noted, however, that the optical isolator 321 is preferably disposed in the vicinity of the light exit of the second laser source 31b, as close as possible, in order to prevent stray light from entering the second laser source 31b.

Figure 5:
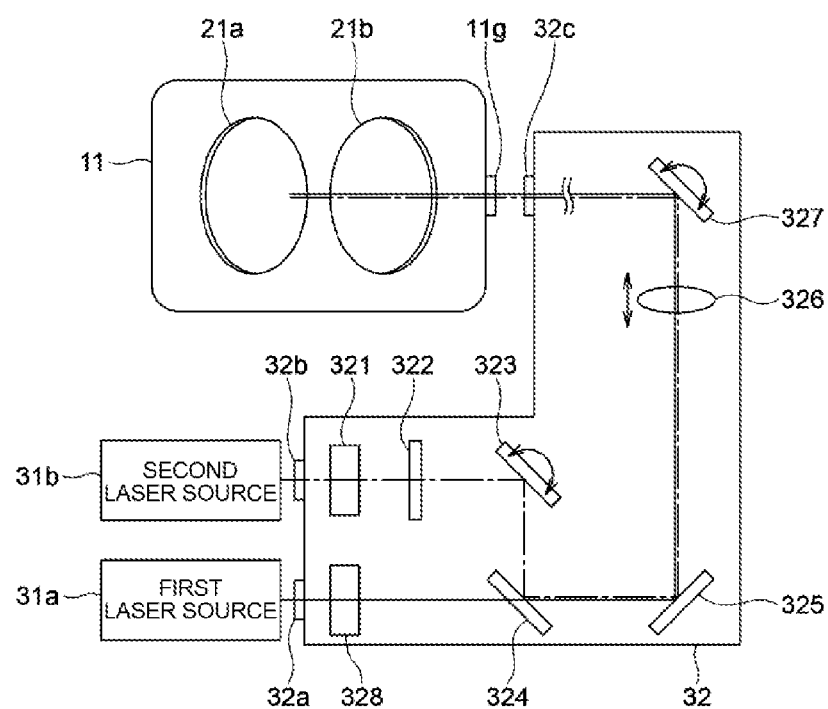
FIG. 5 shows another exemplary configuration of the laser alignment section.

Also, the above-described embodiment may be modified as shown in FIG. 5. Specifically, an optical isolator 328 may be disposed between the first laser source 31a and the beam splitter 324 such that the optical isolator 328 serves as a second element for blocking the return light. The optical isolator 328 is disposed to allow the laser beam L1, which is emitted from the first laser source 31a, to pass therethrough and prevent the light from reaching the light exit of the first laser source 31a.

The optical isolator 328 may be a polarization dependent optical isolator or a polarization independent optical isolator.

Similar to the laser beam L1, part of the laser beam L2 emitted from the second laser source 31b is reflected by the discharge electrode 21a and becomes return light that proceeds backward (toward the second laser source 31b). At this point, part of the return light of the laser beam L2 is not reflected by the beam splitter 324 but passes through the beam splitter 324 although an amount of the passing light is very small. The passing light is guided toward the first laser source 31a.

As described above and illustrated in FIG. 3, the first laser source 31a and the second laser source 31b emit the laser beams respectively at the preset timing only. For example, if the second laser source 31b is equipped with an optical shutter and switches between emission of the laser beam and no emission of the laser beam with the optical shutter, then a small amount of leaking light L2a may be emitted from the second laser source 31b, as shown in FIG. 3, even when the shutter is closed for no emission of the laser beam L2.

If this occurs, the return light of the leaking light L2a may be incident to the first laser source 31a, and therefore the timing of emitting the laser beam L1 from the first laser source 31a changes (shifts) from the preset timing at a next EUV light emission process.

To deal with this, the optical isolator 328 is provided between the first laser source 31a and the beam splitter 324, as depicted in FIG. 5. The optical isolator 328 can block the return light of the laser beam L2a that is reflected by the discharge electrode 21a and guided to the first laser source 31a.

Thus, it is possible to restrict or prevent the unstable operation of the first laser source 31a, which would otherwise be caused by a phenomenon that the return light of the laser beam L2a enters the light exit of the first laser source 31a. It is then possible to emit the laser beam L1 at the preset optimal timing in a stable manner.

Consequently, the interval between the timing of emitting the laser beam L1 and the timing of emitting the laser beam L2 becomes stable, and the EUV emission is carried out stably at a high conversion efficiency.

When the optical isolator 328 is a polarization dependent optical isolator, the optical isolator 328 is disposed at a suitable location on a travelling path of the laser beam L1 from the first laser source 31a to the beam splitter 324. When the optical isolator 328 is a polarization independent optical isolator, the optical isolator 328 is disposed at a suitable location on a travelling path of the laser beam L1 from the first laser source 31a to the window 32c. It should be noted, however, that the optical isolator 328 is preferably disposed in the vicinity of the light exit of the first laser source 31a, as close as possible, in order to prevent stray light from entering the first laser source 31a.

In the above-described embodiment, the optical isolator is used as an element for blocking the return light (return light blocking unit). It should be noted, however, that the present invention is not limited in this regard. Any suitable element may be used instead of the optical isolator as long as the element can prevent the return light of the laser beam, which is emitted from one of the laser sources, from arriving at the light exit of the other laser source.

In the above-described embodiment, the polarization beam splitter is used as an element for synthesizing the optical axes (optical axis synthesizing unit). It should be noted, however, that the present invention is not limited in this regard. Any suitable element may be used instead of the polarization beam splitter as long as the element can synthesize the optical axis of the laser beam L1 emitted from the first laser source 31a and the optical axis of the laser beam L2 emitted from the second laser source 31b to substantially the same axis.

In the above-described embodiment, the laser beam is used as an energy beam to be directed to the high temperature plasma raw material. Alternatively, an ion beam, an electron beam or the like may be used instead of the laser beam.

Other Embodiments

In the above-described embodiment, the DPP type EUV light source device is described. It should be noted that the present invention may be applied to an LPP type EUV light source device. The LPP type EUV light source device irradiates a target material with laser beams and excites the target material to generate plasma.

Figure 6:
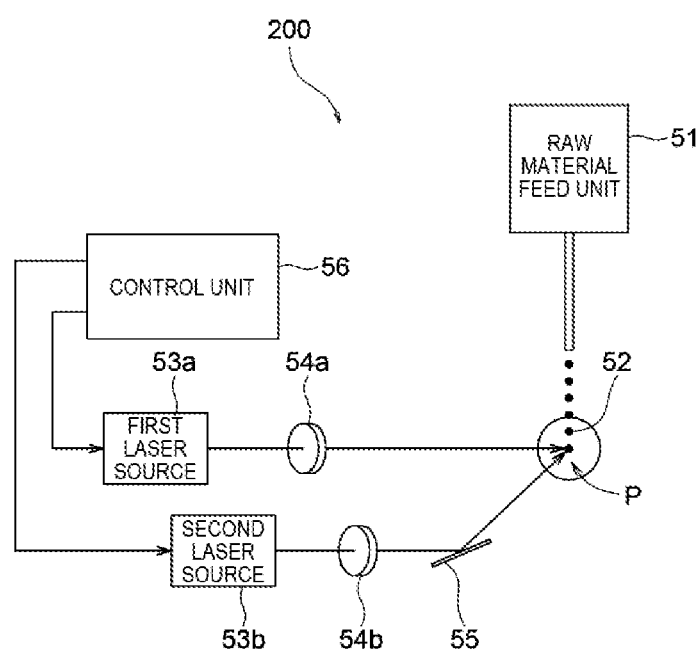
FIG. 6 schematically shows a configuration of an LPP-type extreme ultraviolet light source device.

FIG. 6 illustrates an exemplary LPP type EUV light source device 200.

As illustrated in FIG. 6, the EUV light source device 200 has a raw material feed unit 51. The raw material feed unit 51 provides droplets of target material 52 (e.g., tin (Sn)) to feed the target material 52 to a predetermined target area.

A first laser source 53a irradiates the droplet(s) of target material 52 in the target area with a first laser beam via a light condensing lens 54a.

A second laser source 53b irradiates that area which is irradiated with the first laser beam, with a second laser beam in an overlapping manner via a light condensing lens 54b and a mirror 55.

The raw material feed unit 51, the first laser source 53a and the second laser source 53b are controlled by a control unit 56.

In the LPP type EUV light source device 200, firstly, the first laser source 53a irradiates the raw material (target material 52) with the first laser beam, such as a YAG laser beam, as a preliminary laser (pre-laser) pulse to diffuse the droplet of target material 52. This generates weak plasma, and reduces the density of the target material 52. Then, the second laser source 53b irradiates the weak plasma with the second laser beam (i.e., a $CO_2$ laser beam), as a main laser pulse to cause the plasma to emit effective EUV light.

Because the density of the raw material is decreased by the preliminary laser pulse, the absorption of the $CO_2$ laser beam (i.e., the main laser pulse) by the raw material is improved, and the EUV emission intensity is increased. Also, because the plasma has a relatively low density and the re-absorption of the EUV emission decreases, it is possible to improve the EUV generation efficiency and reduce the debris generation.

Figure 2:
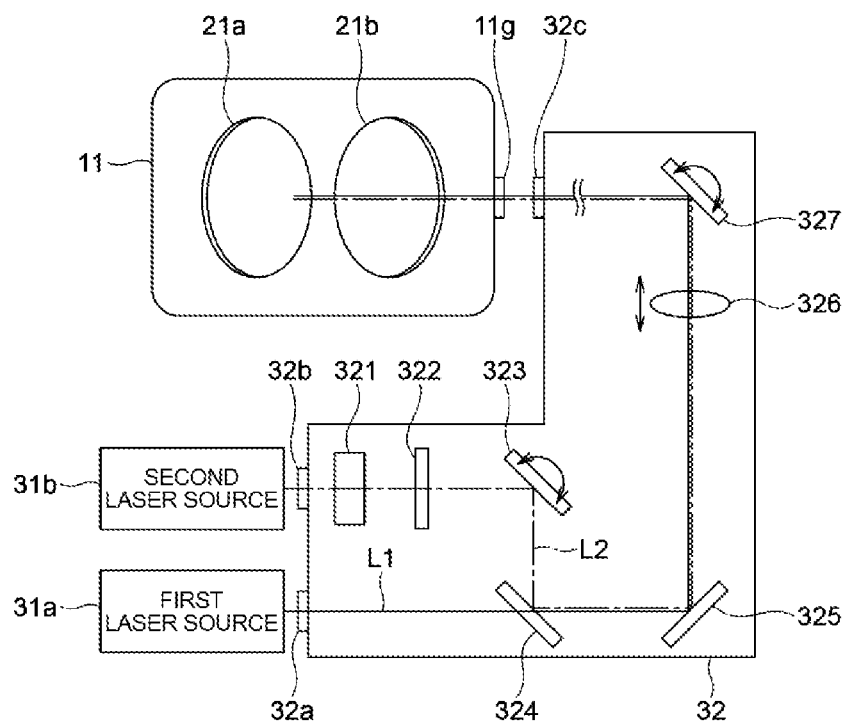
FIG. 2 shows an exemplary configuration of a laser alignment section in the embodiment.

In such LPP type EUV light source device, if the laser alignment section that introduces the laser beam to the target area from each laser source is configured to synthesize the optical axis of the first laser beam and the optical axis of the second laser beam to substantially the same axis and irradiate the target area with the respective laser beam, as in the embodiment shown in FIG. 2, then the return light of the first laser beam, which is emitted from the first laser source 53a, may enter the light exit of the second laser source 53b.

If the return light of the first laser beam, which is emitted from the first laser source 53a, enters the light exit (opening) of the second laser source 53b, the laser oscillation of the second laser source 53b becomes unstable, and the timing of emitting the main laser pulse fluctuates. As a result, the raw material is not able to sufficiently absorb the main laser pulse after the raw material is irradiated with the preliminary laser pulse. Thus, the EUV emission does not take place efficiently.

To deal with this, an optical isolator is disposed near the light exit of the second laser source 53b such that the optical isolator serves as an element (return light blocking element) for blocking the return light of the first laser beam, which is emitted from the first laser source 53a, from entering the light exit of the second laser source 53b. With this optical isolator, it is possible to stabilize the timing of emitting the main laser pulse from the second laser source 53b. Thus, the raw material is able to sufficiently absorb the main laser pulse after the raw material is irradiated with the preliminary laser pulse. Consequently, the EUV emission takes place efficiently.

The optical isolator may be a polarization dependent optical isolator or a polarization independent optical isolator.

An optical isolator may be disposed near the light exit of the first laser source 53a such that the optical isolator serves as a second return light blocking element for blocking the return light of the second laser beam, which is emitted from the second laser source 53b, from entering the light exit of the first laser source 53a. With this second return light blocking element, it is possible to restrict or prevent the unstable laser oscillation of the first laser source 53a, which would otherwise be caused by a phenomenon that the return light of the second laser beam enters the light exit of the first laser source 53a. As a result, it is possible to irradiate the raw material with the preliminary laser pulse at the preset optimal timing in a stable manner.

It should be noted that although the EUV light source device is used as the light source for exposing a semiconductor in the above-described embodiment, the present invention is not limited in this regard. For example, the EUV light source device may be used as a light source of a device for testing an exposure mask or the like. It should also be noted that the particular embodiment is illustrated and described in the foregoing, but the illustrated and described embodiment is a mere example, and does not intend to limit the scope of the present invention. The device and method described in this specification may be practiced in various forms other than the above-described embodiment. Omission, substitutions, changes and/or modifications may be made to the above-described embodiment without departing from the spirit and scope of the present invention as circumstances demand. Embodiments after such omission, substitutions, changes and/or modifications may also be encompassed by the appended claims and/or their equivalents, and fall in the technical scope of the present invention.

INDUSTRIAL APPLICABILITY

The extreme ultraviolet light source device of the present invention can suppress or prevent the unstable operation of the second energy beam emitting unit, which would otherwise be caused by the return light of the first energy beam. The extreme ultraviolet light source device, therefore, can stabilize the respective timing of emitting the two energy beams. As such, it is possible to provide the EUV emission stably and efficiently, and the present invention is industrially applicable.

REFERENCE NUMERALS AND SIGNS

11: Chamber
11a: Partition wall
11b: Discharge space
11c: Light condensing space
11d: EUV outlet
12: EUV light condensing mirror
13: Foil trap
13a: Foil trap holding wall
14: Gas feed nozzle
21a, 21b: Discharge electrode
22a, 22b: High temperature plasma raw material
23a, 23b: Container
24a, 24b: Motor
25a, 25b: Rotating shaft
26a, 26b: Mechanical seal
27: Pulse power supply unit
31a: First laser source
31b: Second laser source
32: Laser alignment section
40: Control unit
100: Extreme ultraviolet light source device (EUV light source device)
51: Raw material feed unit
52: Target material (raw material)
53a: First laser source
53b: Second laser source
54a, 54b: Light condensing lens
55: Mirror
56: Control unit
321: Optical isolator
322: half wave plate
323: Movable mirror
324: Beam splitter
325: Mirror
326: Movable lens
327: Movable mirror

The invention claimed is:

1. An extreme ultraviolet light source device configured to emit extreme ultraviolet light, comprising:
   a first energy beam emitting unit configured to emit a first energy beam to a raw material, the raw material being able to emit the extreme ultraviolet light;
   a second energy beam emitting unit configured to emit a second energy beam to the raw material in an area, which is irradiated with the first energy beam, after the first energy beam emitting unit emits the first energy beam to the raw material unit and before effective extreme ultraviolet light is emitted from the raw material, thereby causing the raw material to emit the extreme ultraviolet light;
   an optical axis synthesizing unit configured to synthesize an optical axis of the first energy beam, which is emitted from the first energy beam emitting unit, and an optical axis of the second energy beam, which is emitted from the second energy beam emitting unit, to substantially a same axis;
   a half wave plate located on an optical path of the second laser beam between the second energy beam emitting unit and the optical axis synthesizing unit; and
   a return light blocking unit configured to block return light of the first energy beam, which is emitted from the first energy beam emitting unit, from arriving at a light exit of the second energy beam emitting unit,
   the return light blocking unit being located between the second energy beam emitting unit and the half wave plate.

2. The extreme ultraviolet light source device according to claim 1, wherein the return light blocking unit is an optical isolator.

3. The extreme ultraviolet light source device according to claim 2, wherein the optical axis synthesizing unit is a polarization beam splitter.

4. The extreme ultraviolet light source device according to claim 2 further comprising a second return light blocking unit configured to block return light of the second energy beam, which is emitted from the second energy beam emitting unit, from arriving at a light exit of the first energy beam emitting unit.

5. The extreme ultraviolet light source device according to claim 2 further comprising:
   a pair of discharge electrodes, which face each other; and
   a pulse power supply unit configured to supply a pulse power to the pair of discharge electrodes, wherein the first energy beam emitting unit is configured to emit the first energy beam to the raw material, which is conveyed onto one discharge electrode in the pair of discharge electrodes, such that the raw material is vaporized and discharge is triggered between the pair of discharge electrodes, and
   the second energy beam emitting unit is configured to emit the second energy beam to the raw material on said one discharge electrode in the pair of discharge electrodes in an area, which is irradiated with the first energy beam, after the first energy beam emitting unit emits the first energy beam and before the discharge is triggered between the pair of discharge electrodes.

6. The extreme ultraviolet light source device according to claim 2, wherein the raw material includes at least one droplet of a target material,
   the first energy beam emitting unit is configured to emit a preliminary laser pulse, as the first energy beam, to diffuse the at least one droplet of the target material, and the second energy beam emitting unit is configured to emit a main laser pulse, as the second energy beam, to cause the raw material to emit the effective extreme ultraviolet light.

7. The extreme ultraviolet light source device according to claim 1, wherein the optical axis synthesizing unit is a polarization beam splitter.

8. The extreme ultraviolet light source device according to claim 7 further comprising a second return light blocking unit configured to block return light of the second energy beam, which is emitted from the second energy beam emitting unit, from arriving at a light exit of the first energy beam emitting unit.

9. The extreme ultraviolet light source device according to claim 7 further comprising:
- a pair of discharge electrodes, which face each other; and
- a pulse power supply unit configured to supply a pulse power to the pair of discharge electrodes, wherein the first energy beam emitting unit is configured to emit the first energy beam to the raw material, which is conveyed onto one discharge electrode in the pair of discharge electrodes, such that the raw material is vaporized and discharge is triggered between the pair of discharge electrodes, and
- the second energy beam emitting unit is configured to emit the second energy beam to the raw material on said one discharge electrode in the pair of discharge electrodes in an area, which is irradiated with the first energy beam, after the first energy beam emitting unit emits the first energy beam and before the discharge is triggered between the pair of discharge electrodes.

10. The extreme ultraviolet light source device according to claim 7, wherein the raw material includes at least one droplet of a target material,
- the first energy beam emitting unit is configured to emit a preliminary laser pulse, as the first energy beam, to diffuse the at least one droplet of the target material, and
- the second energy beam emitting unit is configured to emit a main laser pulse, as the second energy beam, to cause the raw material to emit the effective extreme ultraviolet light.

11. The extreme ultraviolet light source device according to claim 1 further comprising a second return light blocking unit configured to block return light of the second energy beam, which is emitted from the second energy beam emitting unit, from arriving at a light exit of the first energy beam emitting unit.

12. The extreme ultraviolet light source device according to claim 11 further comprising:
- a pair of discharge electrodes, which face each other; and
- a pulse power supply unit configured to supply a pulse power to the pair of discharge electrodes, wherein the first energy beam emitting unit is configured to emit the first energy beam to the raw material, which is conveyed onto one discharge electrode in the pair of discharge electrodes, such that the raw material is vaporized and discharge is triggered between the pair of discharge electrodes, and
- the second energy beam emitting unit is configured to emit the second energy beam to the raw material on said one discharge electrode in the pair of discharge electrodes in an area, which is irradiated with the first energy beam, after the first energy beam emitting unit emits the first energy beam and before the discharge is triggered between the pair of discharge electrodes.

13. The extreme ultraviolet light source device according to claim 11, wherein the raw material includes at least one droplet of a target material,
- the first energy beam emitting unit is configured to emit a preliminary laser pulse, as the first energy beam, to diffuse the at least one droplet of the target material, and
- the second energy beam emitting unit is configured to emit a main laser pulse, as the second energy beam, to cause the raw material to emit the effective extreme ultraviolet light.

14. The extreme ultraviolet light source device according to claim 1 further comprising:
- a pair of discharge electrodes, which face each other; and
- a pulse power supply unit configured to supply a pulse power to the pair of discharge electrodes, wherein the first energy beam emitting unit is configured to emit the first energy beam to the raw material, which is conveyed onto one discharge electrode in the pair of discharge electrodes, such that the raw material is vaporized and discharge is triggered between the pair of discharge electrodes, and
- the second energy beam emitting unit is configured to emit the second energy beam to the raw material on said one discharge electrode in the pair of discharge electrodes in an area, which is irradiated with the first energy beam, after the first energy beam emitting unit emits the first energy beam and before the discharge is triggered between the pair of discharge electrodes.

15. The extreme ultraviolet light source device according to claim 1, wherein the raw material includes at least one droplet of a target material,
- the first energy beam emitting unit is configured to emit a preliminary laser pulse, as the first energy beam, to diffuse the at least one droplet of the target material, and
- the second energy beam emitting unit is configured to emit a main laser pulse, as the second energy beam, to cause the raw material to emit the effective extreme ultraviolet light.

* * * * *